United States Patent
Nakayama

(10) Patent No.: US 11,558,085 B2
(45) Date of Patent: Jan. 17, 2023

(54) TRANSMISSION APPARATUS, TRANSMISSION TIME FLUCTUATION COMPENSATION METHOD, AND NON-TRANSITORY COMPUTER READABLE MEDIUM STORING TRANSMISSION TIME FLUCTUATION COMPENSATION PROGRAM

(71) Applicant: NEC Corporation, Tokyo (JP)

(72) Inventor: Naoya Nakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 149 days.

(21) Appl. No.: 17/272,421

(22) PCT Filed: Aug. 20, 2019

(86) PCT No.: PCT/JP2019/032387
§ 371 (c)(1),
(2) Date: Mar. 1, 2021

(87) PCT Pub. No.: WO2020/050004
PCT Pub. Date: Mar. 12, 2020

(65) Prior Publication Data
US 2021/0328629 A1    Oct. 21, 2021

(30) Foreign Application Priority Data

Sep. 3, 2018    (JP) .............................. JP2018-164334

(51) Int. Cl.
*H04B 7/005*    (2006.01)
*H04B 17/30*    (2015.01)
(Continued)

(52) U.S. Cl.
CPC ........... *H04B 7/005* (2013.01); *H04B 7/0828* (2013.01); *H04B 7/2126* (2013.01); *H04B 17/30* (2015.01)

(58) Field of Classification Search
CPC ........ H04B 7/00; H04B 7/005; H04B 7/0828; H04B 7/2126; H04B 17/30
See application file for complete search history.

(56) References Cited

U.S. PATENT DOCUMENTS

| 7,054,296 B1 * | 5/2006 | Sorrells .................. H04B 1/406 370/480 |
| 2005/0255819 A1 | 11/2005 | Kawamoto et al. |
| 2010/0246637 A1 | 9/2010 | Miyatani |

FOREIGN PATENT DOCUMENTS

| CN | 106253922 B * | 8/2018 | ........... H04B 1/1081 |
| DE | 102015122336 A1 * | 6/2017 | ........... H04B 1/1081 |

(Continued)

OTHER PUBLICATIONS

International Search Report for PCT Application No. PCT/JP2019/032387, dated Nov. 5, 2019.

(Continued)

*Primary Examiner* — Blane J Jackson
(74) *Attorney, Agent, or Firm* — Sughrue Mion, PLLC

(57) ABSTRACT

A transmission apparatus (10) according to the present disclosure incudes: a correction value calculation unit (130) configured to calculate a correction value for correcting an initial standby time of a direct wave signal or an indirect wave signal based on a reception time of the direct wave signal and a reception time of the indirect wave signal that follows the direct wave signal, and a transmission time fluctuation compensation unit (140) configured to calculate the standby time by correcting the initial standby time using the correction value and cause the direct wave signal or the indirect wave signal to stand by in accordance with the standby time. The correction value calculation unit (130) calculates a correction value for increasing the standby time of the direct wave signal or reducing the standby time of the indirect wave signal.

6 Claims, 13 Drawing Sheets

(51) Int. Cl.
    *H04B 7/08*           (2006.01)
    *H04B 7/212*         (2006.01)

(56) References Cited

FOREIGN PATENT DOCUMENTS

| | | | | |
|---|---|---|---|---|
| EP | 0641102 | A2 * | 3/1995 | ............... H04B 1/02 |
| EP | 0667686 | A2 * | 8/1995 | ............ H04B 1/707 |
| JP | 3034309 | B2 * | 4/2000 | ............... H01Q 7/06 |
| JP | 2005-354677 | A | 12/2005 | |
| JP | 2009520425 | A * | 5/2009 | .......... H04K 1/7105 |
| JP | 2010-239395 | A | 10/2010 | |
| JP | 2011-049937 | A | 3/2011 | |
| JP | 2017-147667 | A | 8/2017 | |
| WO | WO-9705709 | A1 * | 2/1997 | ........... H04B 1/7097 |

OTHER PUBLICATIONS

Kitayama, Kazuhiko et al., "Considerations and Countermeasures of Errors generated when Delay Time is not Integer of Sampling Interval at Delay Profile Measurement in Digital Terrestrial Television Broadcasting", The Journal of the Institute of Image Information and Television Engineers, The Institute of Image Information and Television Engineers, vol. 66, No. 4, Apr. 1, 2012, pp. J119-J123.

\* cited by examiner

Fig. 5
<TAP COEFFICIENTS WHEN DIRECT-WAVE-DOMINATED MULTIPATH FADING IS OCCURRING>
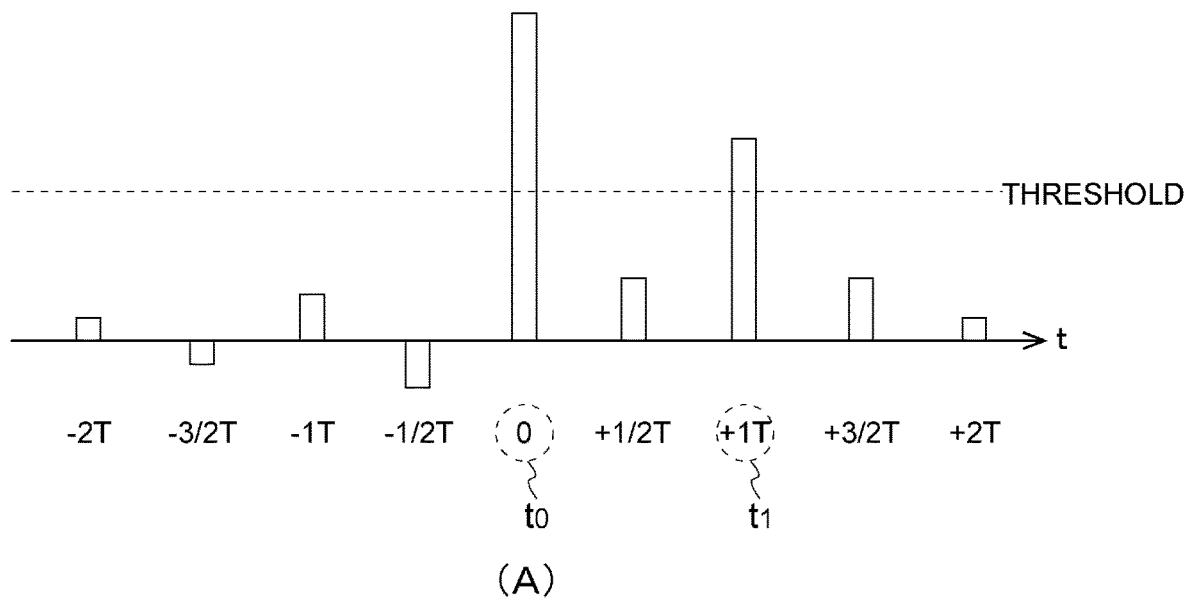
(A)
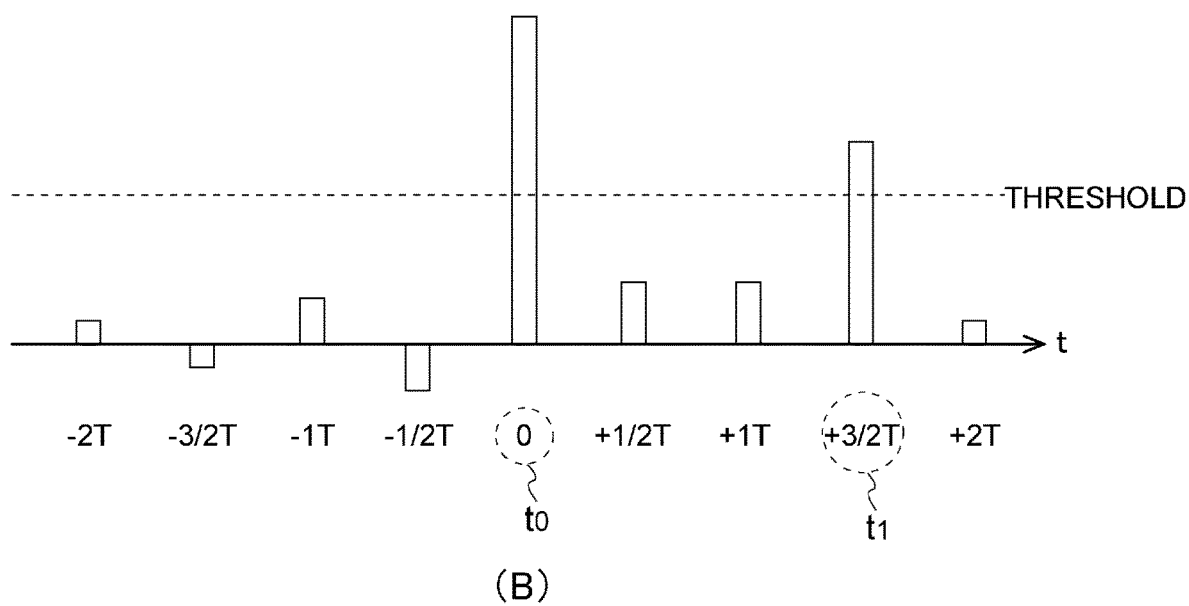
(B)

Fig. 6
<TAP COEFFICIENTS WHEN INDIRECT-WAVE-DOMINATED MULTIPATH FADING IS OCCURRING>
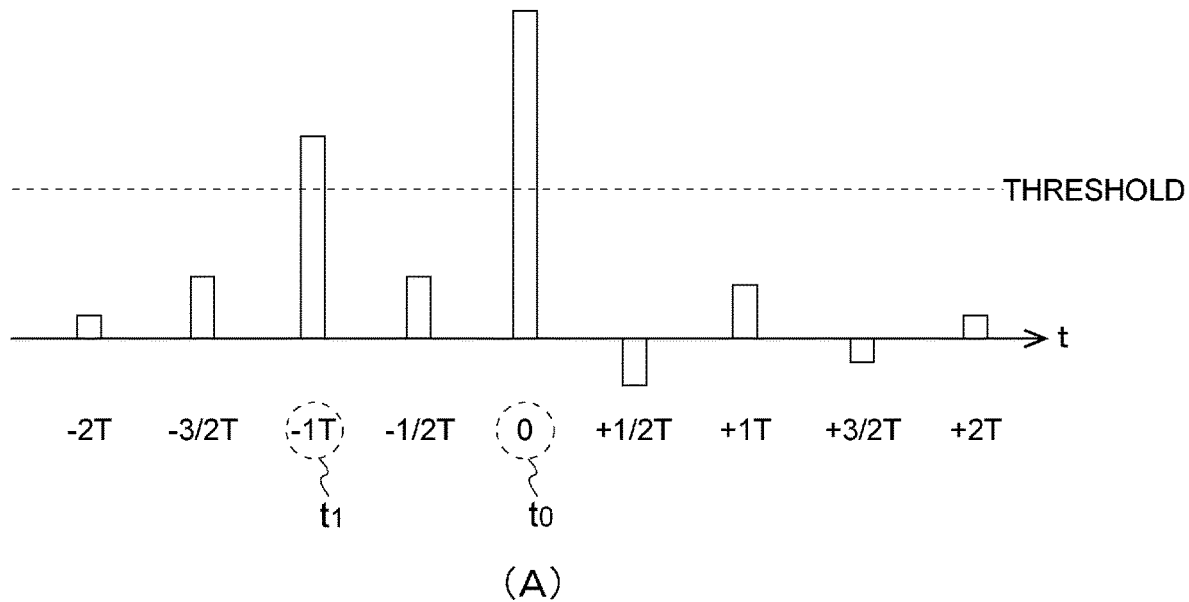
(A)
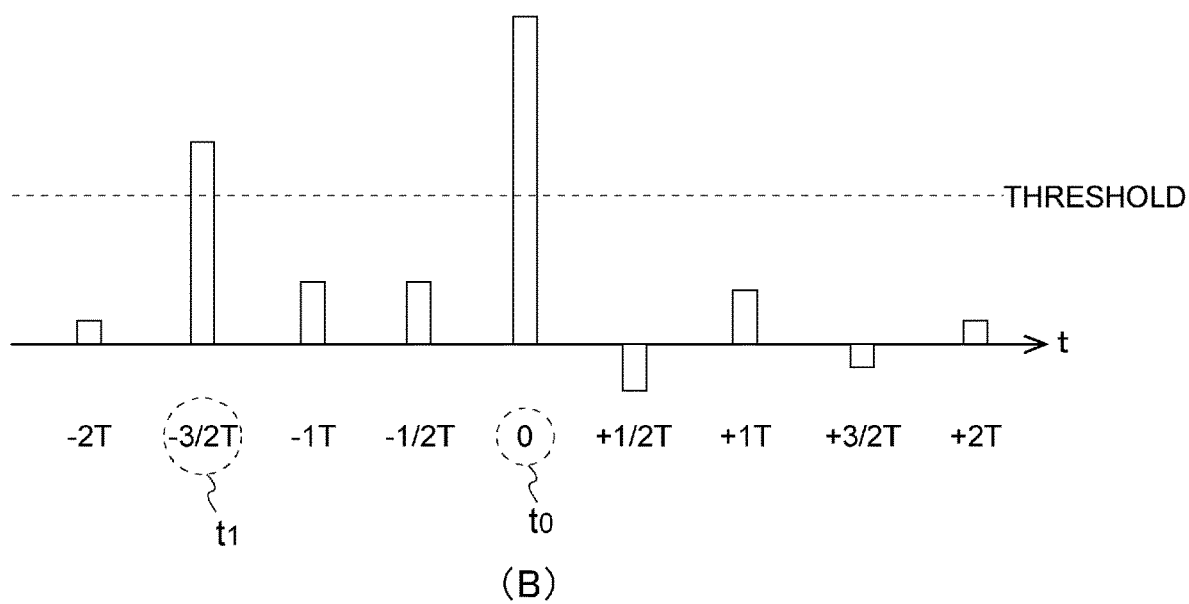
(B)

<WHEN MULTIPATH FADING IS NOT OCCURRING>
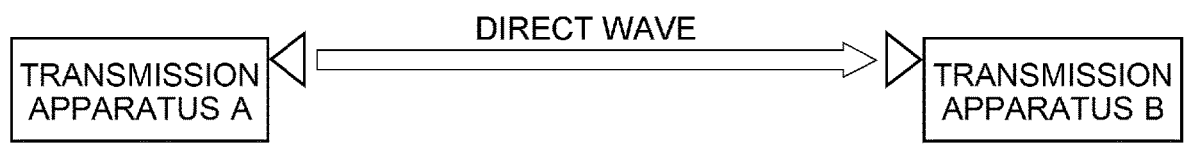
<WHEN MULTIPATH FADING IS OCCURRING>
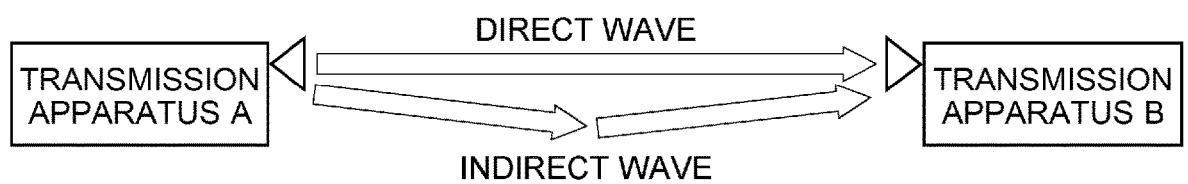
Fig. 10

TRANSMISSION APPARATUS, TRANSMISSION TIME FLUCTUATION COMPENSATION METHOD, AND NON-TRANSITORY COMPUTER READABLE MEDIUM STORING TRANSMISSION TIME FLUCTUATION COMPENSATION PROGRAM

This application is a National Stage Entry of PCT/JP2019/032387 filed on Aug. 20, 2019, which claims priority from Japanese Patent Application 2018-164334 filed on Sep. 3, 2018, the contents of all of which are incorporated herein by reference, in their entirety.

TECHNICAL FIELD

The present disclosure relates to a transmission apparatus, a transmission time fluctuation compensation method, and a transmission time fluctuation compensation program, in particular to a transmission apparatus, a transmission time fluctuation compensation method, and a transmission time fluctuation compensation program that compensate for fluctuation of a transmission time of a radio wave signal.

BACKGROUND ART

It has been known that, in a radio communication that uses radio waves, a change in the environment of a radio wave propagation path causes a change in a path of radio waves between a transmitting device and a receiving device, and occurrence of indirect waves (reflected waves or refracted waves), which are delay waves, fluctuates a transmission time of a radio wave signal. One problem resulting from the fluctuation of the transmission time of the radio wave signal is a phenomenon called multipath fading. Multipath fading is a phenomenon in which a direct wave and an indirect wave interfere with each other and thus inter-symbol interference occurs, as shown in FIG. 10.

As one example of techniques for preventing the aforementioned inter-symbol interference, an inter-carrier interference removal apparatus disclosed in Patent Literature 1 is intended to prevent inter-symbol interference by estimating a delay profile based on a reception signal, calculating a window function by calculating a time fluctuation amount of amplitude and a phase of incoming waves to be calculated based on the delay profile, and multiplying effective data of the reception signal by the window function.

CITATION LIST

Patent Literature

[Patent Literature 1] Japanese Unexamined Patent Application Publication No. 2011-49937

SUMMARY OF INVENTION

Technical Problem

However, since the inter-carrier interference removal apparatus disclosed in Patent Literature 1 is intended to prevent the inter-symbol interference, there is a problem that it is impossible to compensate for the fluctuation of the transmission time of the radio wave signal that may occur due to the change in the environment of the radio wave propagation path described above.

The present disclosure has been made in view of the aforementioned problem and aims to provide a transmission apparatus, a transmission time fluctuation compensation method, and a transmission time fluctuation compensation program capable of compensating for fluctuation of the transmission time of a radio wave signal that may occur due to a change in the environment of a radio wave propagation path.

Solution to Problem

A transmission apparatus according to one aspect of the present disclosure includes: a correction value calculation unit configured to calculate a correction value for correcting an initial standby time of a direct wave signal or an indirect wave signal based on a reception time of the direct wave signal and a reception time of the indirect wave signal that follows the direct wave signal; and a transmission time fluctuation compensation unit configured to calculate a standby time by correcting the initial standby time using the correction value and causing the direct wave signal or the indirect wave signal to stand by in accordance with the standby time, in which the correction value calculation unit calculates a correction value for increasing the standby time of the direct wave signal when the intensity of the direct wave signal is larger than the intensity of the indirect wave signal; and the correction value calculation unit calculates a correction value for reducing the standby time of the indirect wave signal when the intensity of the indirect wave signal is larger than the intensity of the direct wave signal.

Advantageous Effects of Invention

According to the present disclosure, it is possible to provide a transmission apparatus, a transmission time fluctuation compensation method, and a transmission time fluctuation compensation program capable of compensating for the fluctuation of the transmission time of the radio wave signal that may occur due to the change in the environment of the radio wave propagation path.

BRIEF DESCRIPTION OF DRAWINGS

FIG. 5 is a diagram showing one example of tap coefficients when direct-wave-dominated multipath fading is occurring;

FIG. 6 is a diagram showing one example of tap coefficients when indirect-wave-dominated multipath fading is occurring;

FIG. 10 is a conceptual diagram showing multipath fading in a radio propagation path;

DESCRIPTION OF EMBODIMENTS

First Example Embodiment

Figure 1:
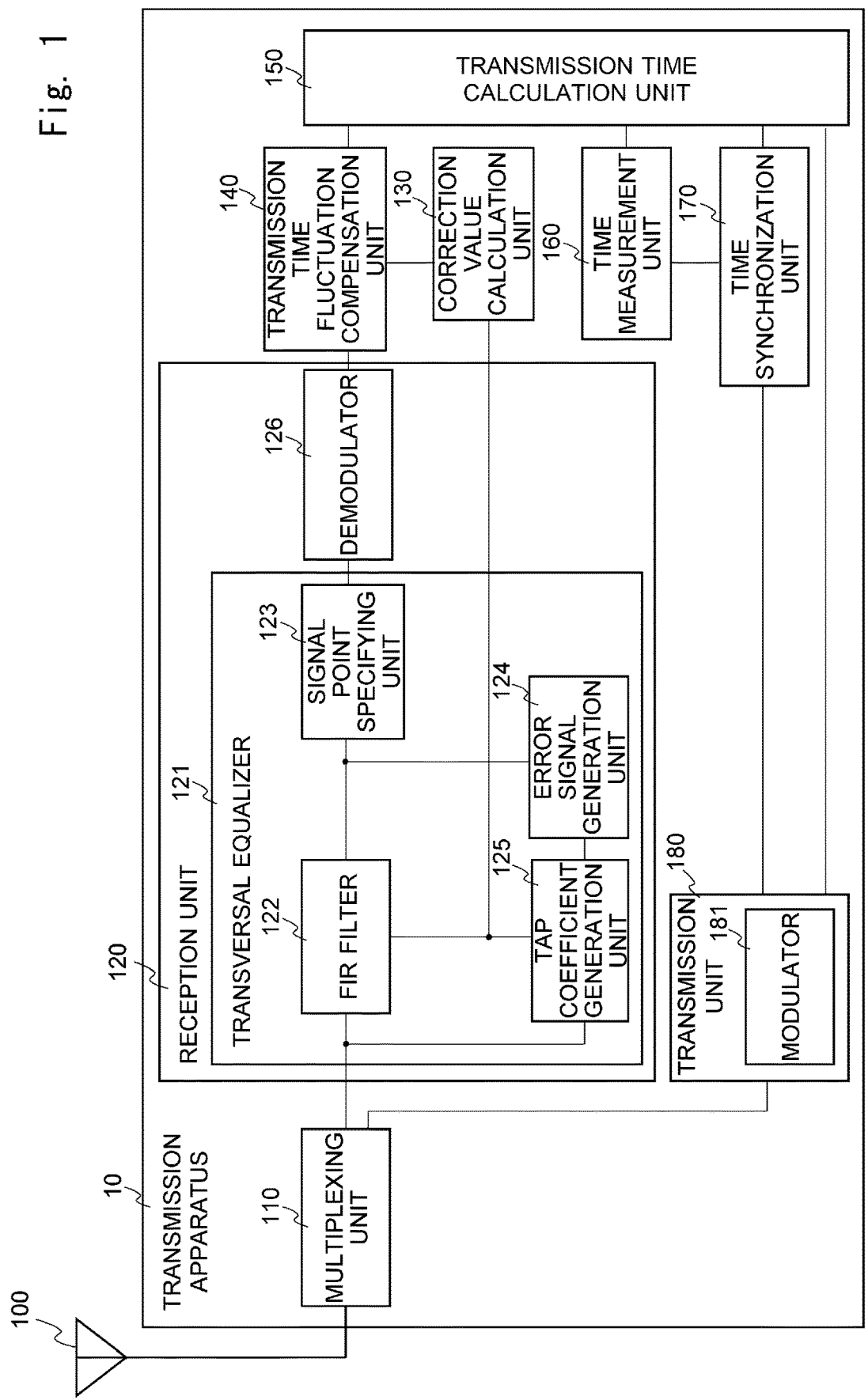
FIG. 1 is a block diagram showing a detailed configuration of a transmission apparatus according to a first example embodiment of the present disclosure.

Hereinafter, with reference to the drawings, example embodiments of the present disclosure will be described. FIG. 1 is a block diagram showing a detailed configuration of a transmission apparatus according to a first example embodiment of the present disclosure. A transmission apparatus 10 includes an antenna 100, a multiplexing unit 110, a reception unit 120, a correction value calculation unit 130, a transmission time fluctuation compensation unit 140, a transmission time calculation unit 150, a time measurement unit 160, a time synchronization unit 170, and a transmission unit 180.

The antenna 100 is a device that receives radio waves that propagate through the space and transmits radio waves into the space. Upon receiving the radio waves, the antenna 100 supplies a signal based on the radio waves (hereinafter this signal is referred to as a "radio wave signal") to the multiplexing unit 110. The antenna 100 further transmits a signal to be transmitted received from the multiplexing unit 110 to the space as the radio wave signal.

The multiplexing unit 110 is a logic circuit that multiplexes a plurality of signals to be transmitted. Upon multiplexing the signal to be transmitted, the multiplexing unit 110 supplies the multiplexed signal to be transmitted to the antenna 100. The multiplexing unit 110 further supplies the radio wave signal received from the antenna 100 to the reception unit 120.

The reception unit 120, which is a logic circuit that processes the radio wave signal output from the multiplexing unit 110, includes a transversal equalizer 121 and a demodulator 126. The transversal equalizer 121 includes a Finite Impulse Response (FIR) filter 122, a signal point specifying unit 123, an error signal generation unit 124, and a tap coefficient generation unit 125.

The FIR filter 122 is a logic circuit that removes inter-symbol interference by multipath fading from the radio wave signal using a tap coefficient output from the tap coefficient generation unit 125 that will be described later. The FIR filter 122 is able to remove the inter-symbol interference by convolving the tap coefficient to the radio wave signal.

Figure 3:
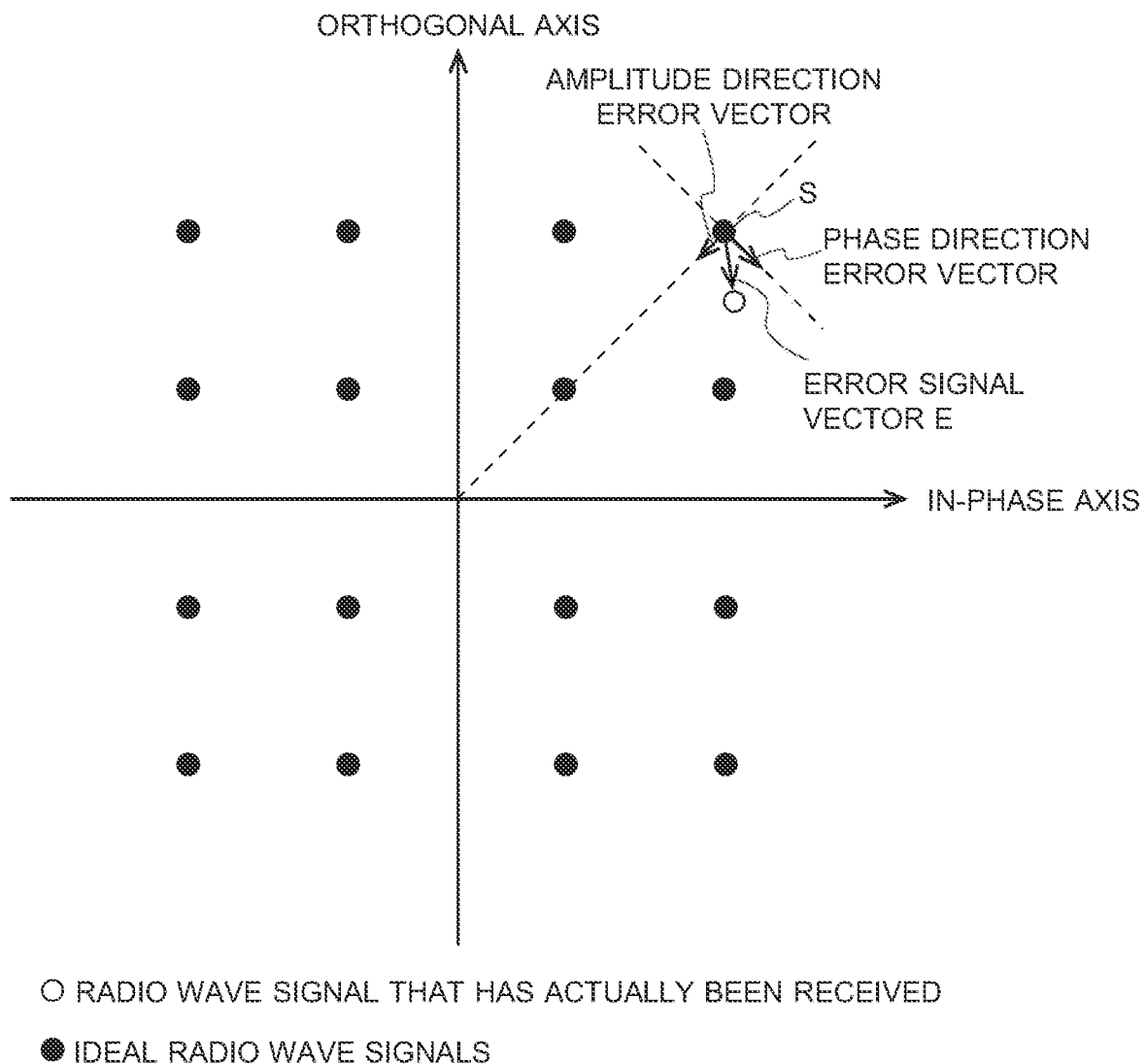
FIG. 3 is a diagram showing one example of a constellation diagram.

The signal point specifying unit 123 is a logic circuit for performing hard decision for specifying a signal point in which the Euclidean distance from the radio wave signal that the transmission apparatus 10 has actually received becomes a minimum in a sampling period T from among a plurality of signal points indicating ideal radio wave signals in a constellation of a modulation system that is the same as the modulation system used by a modulator 181 of the transmission unit 180. When, for example, the modulator 181 uses 16 Quadrature Amplitude Modulation (QAM) as a modulation system, the signal point specifying unit 123 specifies the signal point S in which the Euclidean distance from the actual radio wave signal becomes a minimum from among 16 ideal radio wave signals, as shown in FIG. 3. The signal point specifying unit 123 supplies information indicating the specified signal point S to the error signal generation unit 124 and supplies information indicating this signal point S and the radio wave signal to the demodulator 126. While 16 QAM is employed as the modulation system in this example embodiment, other modulation systems may instead be employed. Further, in this example embodiment, the sampling period T may be a desired period capable of sampling a direct wave signal and an indirect wave signal that relates to the direct waves.

The error signal generation unit 124 is a logic circuit that generates an error signal vector E in a sampling period T using the radio wave signal output from the FIR filter 122 and the information indicating the signal point S output from the signal point specifying unit 123. As shown in FIG. 3, the error signal vector E, which is a vector that indicates the error between the signal point S and the actual radio wave signal, is composed of an amplitude direction error vector and a position direction error vector. The error signal generation unit 124 generates the error signal vector E from the positional information of the radio wave signal in the signal space and the positional information of the signal point S and supplies the error signal vector E to the tap coefficient generation unit 125.

The tap coefficient generation unit 125 is a logic circuit that generates a tap coefficient that indicates the intensity of the radio wave signal at the sampling period T using the radio wave signal output from the multiplexing unit 110 and the error signal vector E output from the error signal generation unit 124. One possible method for calculating the tap coefficient is, for example, calculating a correlation between the error signal vector E and the radio wave signal, integrating this value, and then obtaining a value obtained by reversing the sign of the obtained value as a tap coefficient. Accordingly, it is possible to obtain a transversal filter that uses a Least Mean Square (LMS) algorithm.

Upon generating the tap coefficients, the tap coefficient generation unit 125 compares the values of these tap coefficients and specifies the radio wave signal that relates to the tap coefficient whose value becomes a maximum, that is, the radio wave signal whose signal intensity is the largest. Then the tap coefficient generation unit 125 calculates a difference time between the reception time of the radio wave signal and the reception time of the radio wave signal that relates to each tap coefficient using the reception time of the radio wave signal as a reference time $t_0$ ($t_0$=0). This difference time may be expressed as a positive or negative multiple of the sampling period T. The tap coefficient generation unit 125 supplies these tap coefficients and the difference time that relates to the tap coefficients to the FIR filter 122 and the correction value calculation unit 130.

Figure 4:
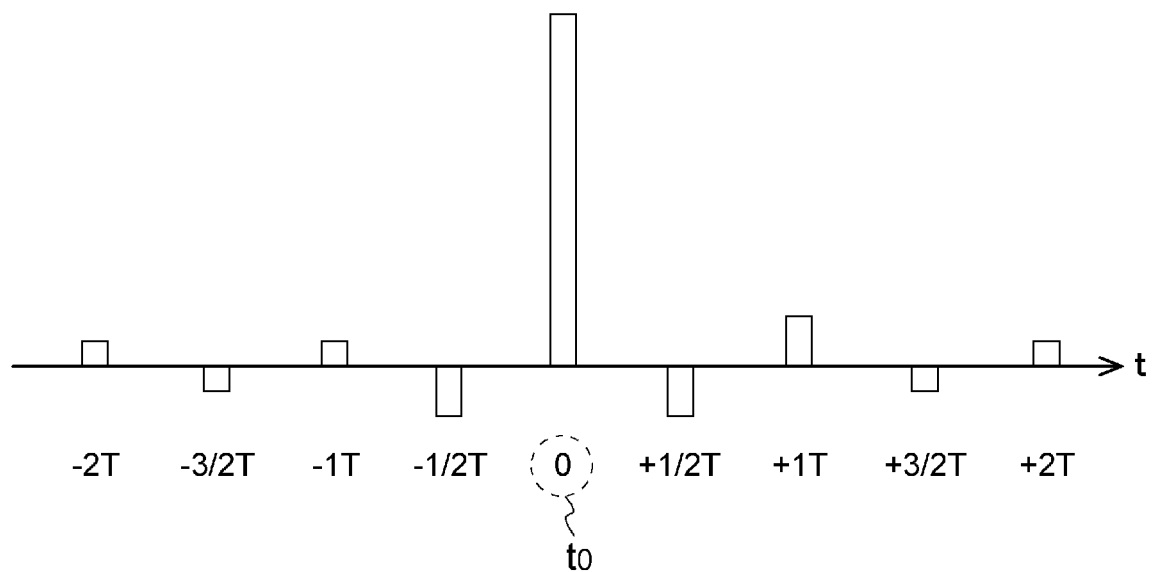
FIG. 4 is a diagram showing one example of tap coefficients when multipath fading is not occurring.

FIG. 4 is a diagram showing tap coefficients in a case where multipath fading is not occurring. In the example shown in FIG. 4, the intensity of the direct wave signal is a maximum. Therefore, the tap coefficient generation unit 125 calculates the difference time for each tap coefficient using the reception time of the direct wave signal as the reference time $t_0$. When multipath fading is not occurring, that is, when the transmission apparatus 10 has received only direct waves and has not received indirect waves, as shown in FIG. 4, only one tap coefficient that relates to the direct wave signal exceeds a threshold and the values of the other tap coefficients become values similar to one another before and after the reference time $t_0$.

FIG. 5 is a diagram showing tap coefficients in a case where direct-wave-dominated multipath fading is occurring in which the intensity of the direct wave signal is larger than the intensity of the indirect wave signal. In the example shown in FIG. 5, the intensity of the direct wave signal is a maximum. Therefore, the tap coefficient generation unit 125 calculates the difference time for each tap coefficient using the reception time of the direct wave signal as the reference time $t_0$. When the direct-wave-dominated multipath fading due to two waves of a direct wave and an indirect wave is occurring, as shown in FIG. 5, a tap coefficient that relates to the direct wave signal and a tap coefficient that relates to the indirect wave signal exceed the threshold. Further, due to the presence of an indirect wave that reaches the transmission apparatus 10 after the reference time $t_0$, the value of the tap coefficient after the reference time $t_0$ becomes larger than the value of the tap coefficient before the reference time $t_0$.

FIG. 6 is a diagram showing tap coefficients in a case where indirect-wave-dominated multipath fading is occurring in which the intensity of the indirect wave signal is larger than the intensity of the direct wave signal. In the example shown in FIG. 6, the intensity of the indirect wave signal is a maximum. Therefore, the tap coefficient generation unit 125 calculates the difference time for each tap coefficient using the reception time of the indirect wave signal as the reference time $t_0$. When the indirect-wave-dominated multipath fading due to two waves of a direct wave and an indirect wave is occurring, as shown in FIG. 6, a tap coefficient that relates to the direct wave signal and a tap coefficient that relates to the indirect wave signal exceed the threshold. Further, due to the presence of a direct wave that reaches the transmission apparatus 10 before the reference time $t_0$, the value of the tap coefficient before the reference time $t_0$ becomes larger than the value of the tap coefficient after the reference time $t_0$.

Figure 11:
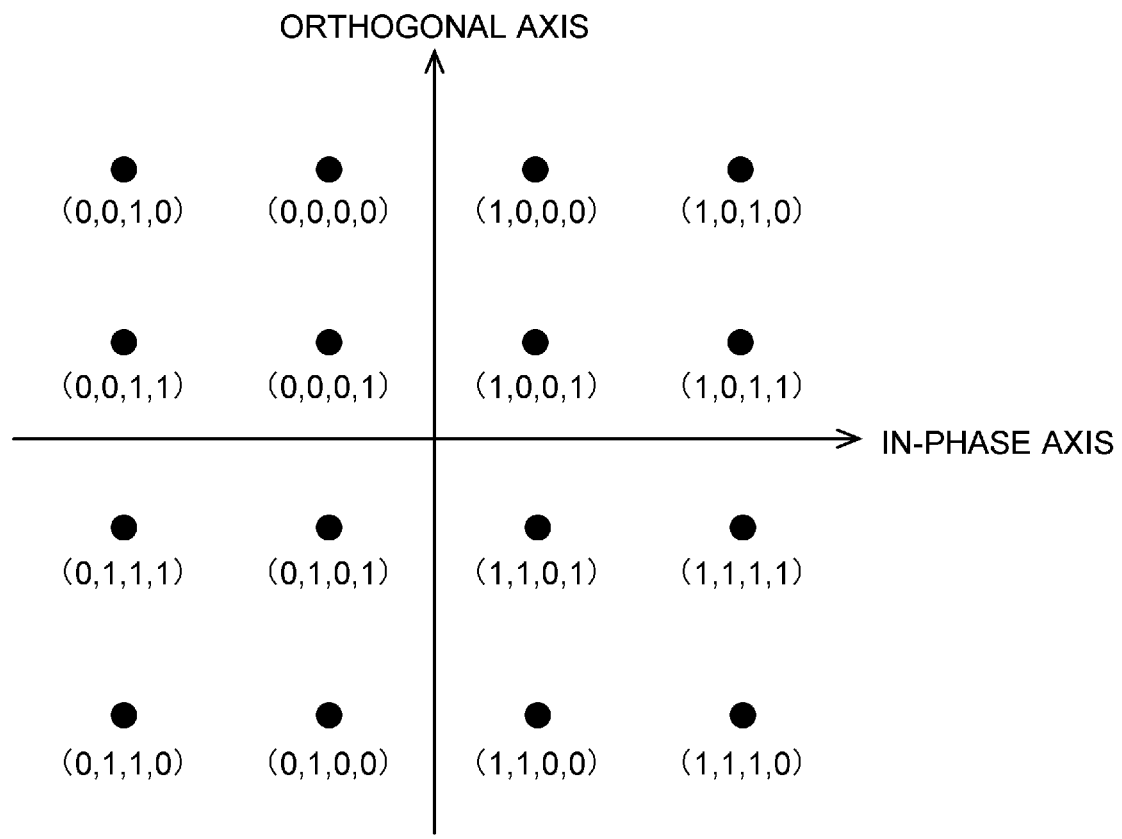
FIG. 11 is a diagram showing one example of mapping of a constellation of a modulation system used by the transmission apparatus according to the first example embodiment of the present disclosure.
Figure 12:
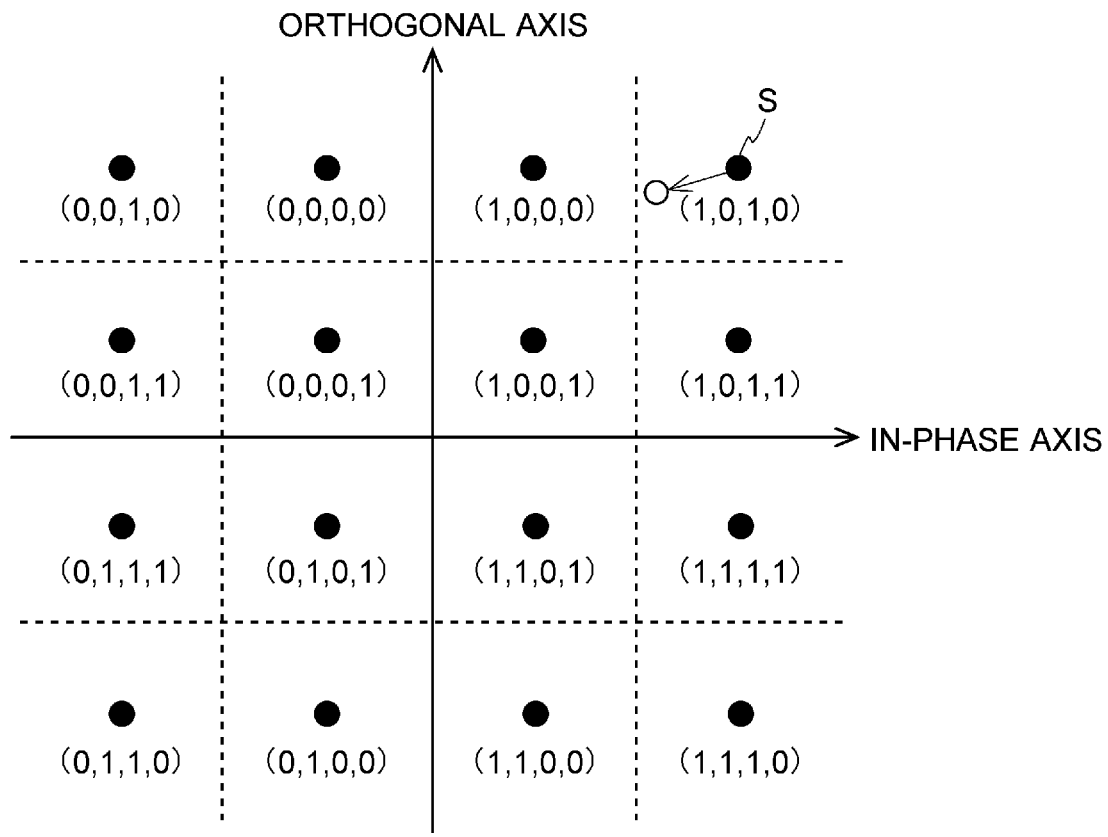
FIG. 12 is a diagram showing one example of a signal point S in which the transmission apparatus according to the first example embodiment of the present disclosure has performed hard decision, and data mapped to the signal point S.

The demodulator 126 is a logic circuit that demodulates the radio wave signal in a modulation system that is the same as the modulation system used by the modulator 181 at a sampling period T based on the signal point specified by the signal point specifying unit 123. When, for example, the modulator 181 uses the modulation system of the constellation shown in FIG. 11, the demodulator 126 reproduces data (1, 0, 1, 0) mapped to the signal point S specified by the signal point specifying unit 123 by hard decision, as shown in FIG. 12, thereby demodulating the radio wave signal. Upon demodulating the radio wave signal, the demodulator 126 supplies the demodulated radio wave signal to the transmission time fluctuation compensation unit 140.

The correction value calculation unit 130 is a logic circuit configured to calculate a correction value for correcting the initial standby time of the direct wave signal or the indirect wave signal based on the reception time of the direct wave signal and the reception time of the indirect wave signal that follows the direct wave signal. The correction value calculation unit 130 calculates a correction value for deriving the standby time of the direct wave signal or the indirect wave signal that relates to the maximum tap coefficient among the tap coefficients output from the tap coefficient generation unit 125, that is, the standby time of the direct wave signal or the indirect wave signal whose signal intensity is a maximum.

Specifically, the correction value calculation unit 130 calculates, when the number of tap coefficients that exceed the threshold is equal to or larger than two, the correction value using the reception time of the direct wave signal or the indirect wave signal that relates to these tap coefficients. When, for example, the number of tap coefficients is two, the correction value calculation unit 130 is able to calculate the correction value using the following Expression 1. In this example embodiment, the first radio wave signal among the radio wave signals that relate to the tap coefficients that exceed the threshold is used as the direct wave signal. A value indicating the intensity of the radio wave signal that exceeds the noise level may be, for example, employed as the threshold.

$$\text{Correction value} = (t_0 + t_1)/2 \qquad \text{<Expression 1>}$$

As the reception time of the direct wave signal or the indirect wave signal that relates to the maximum tap coefficient among the tap coefficients that have exceeded the threshold, "0" is substituted into the reference time $t_0$. A difference time between the reception time of the direct wave signal or the indirect wave signal that relates to the second largest tap coefficient among the tap coefficients that have exceeded the threshold and the reception time of the direct wave signal or the indirect wave signal that relates to the maximum tap coefficient is substituted into $t_1$.

When the number of tap coefficients is equal to or larger than three, that is, when multipath fading is occurring by a direct wave and a plurality of indirect waves, the correction value calculation unit 130 calculates the difference time for each tap coefficient that has exceeded the threshold using the reception time of the radio wave signal that relates to the maximum tap coefficient among the tap coefficients that have exceeded the threshold, that is, the radio wave signal whose signal intensity is the largest, as a reference time. Then the correction value calculation unit 130 is able to calculate the correction value by dividing the sum of these difference times by the number of tap coefficients that have exceeded the threshold. In the following description, with reference to FIGS. 5 and 6, a method of calculating the correction value will be described in detail.

FIG. 5 is one example of tap coefficients when the direct-wave-dominated multipath fading is occurring. FIG. 5(A) shows tap coefficients when the direct-wave-dominated multipath fading is occurring in which the degree of the delay of the indirect wave signal is small. In this case, the correction value calculation unit 130 uses the reception time of the direct wave signal that relates to the maximum tap coefficient as the reference time $t_0$, substitutes "0" into $t_0$, and substitutes the difference time "+1T" of the indirect wave signal that relates to the second largest tap coefficient into $t_1$, thereby calculating the correction value (+½T).

FIG. 5(B) shows tap coefficients when the direct-wave-dominated multipath fading is occurring in which the degree of the delay of the indirect wave signal is large. In this case, the correction value calculation unit 130 uses the reception time of the direct wave signal that relates to the maximum tap coefficient as the reference time $t_0$, substitutes "0" into $t_0$, and substitutes the difference time "+3⁄2T" of the indirect wave signal that relates to the second largest tap coefficient into $t_1$, thereby calculating the correction value (+¾T).

As described above, when the direct-wave-dominated multipath fading is occurring, the correction value calculation unit 130 uses the reception time of the direct wave signal as the reference time. Therefore, the reception time of the indirect wave signal, which is a delay time, becomes a positive value, and the correction value calculation unit 130 calculates a positive correction value, that is, a correction value that increases the initial standby time. When the degree of the delay of the indirect wave signal is large, the correction value calculation unit 130 calculates the correction value that increases the degree of the increase in the initial standby time. On the other hand, when the degree of the delay of the indirect wave signal is small, the correction value calculation unit 130 calculates the correction value that decreases the degree of the increase in the initial standby time.

FIG. 6 shows one example of tap coefficients when the indirect-wave-dominated multipath fading is occurring. FIG. 6(A) shows tap coefficients when the indirect-wave-dominated multipath fading is occurring in which the degree of the delay of the indirect wave signal is small. In this case, the correction value calculation unit 130 uses the reception time of the indirect wave signal that relates to the maximum tap coefficient as the reference time $t_0$, substitutes "0" into $t_0$, and substitutes the difference time "−1T" of the direct wave signal that relates to the second largest tap coefficient into $t_1$, thereby calculating the correction value (−½T).

FIG. 6(B) shows tap coefficients when the indirect-wave-dominated multipath fading is occurring in which the degree of the delay of the indirect wave signal is large. In this case, the correction value calculation unit 130 uses the reception time of the indirect wave signal that relates to the maximum tap coefficient as the reference time $t_0$, substitutes "0" to $t_0$, and substitutes the difference time "−3/2T" of the direct wave signal that relates to the second largest tap coefficient into $t_1$, thereby calculating the correction value (−¾T).

As described above, when the indirect-wave-dominated multipath fading is occurring, the correction value calculation unit 130 uses the reception time of the indirect wave signal as the reference time. Therefore, the reception time of the direct wave signal that precedes the indirect waves becomes a negative value and the correction value calculation unit 130 calculates a negative correction value, i.e., a correction value that decreases the initial standby time. When the degree of the delay of the indirect wave signal is large, the correction value calculation unit 130 calculates the correction value for increasing the degree of the decrease in the initial standby time. On the other hand, when the degree of the delay of the indirect wave signal is small, the correction value calculation unit 130 calculates the correction value for decreasing the degree of the decrease in the initial standby time.

The transmission time fluctuation compensation unit 140 is a logic circuit that calculates the standby time by correcting the initial standby time using the correction value output from the correction value calculation unit 130 and causes the direct wave signal or the indirect wave signal to stand by in accordance with the standby time. In this example embodiment, the transmission time fluctuation compensation unit 140 calculates the standby time by adding the initial standby time to the correction value output from the correction value calculation unit 130.

When, for example, the direct-wave-dominated multipath fading is occurring in which the degree of the delay of the indirect wave signal shown in FIG. 5(A) is small, the transmission time fluctuation compensation unit 140 adds the correction value (+½T) to the initial standby time to calculate the standby time of the direct wave signal. On the other hand, when the direct-wave-dominated multipath fading is occurring in which the degree of the delay of the indirect wave signal shown in FIG. 5(B) is large, the transmission time fluctuation compensation unit 140 adds the correction value (+¾T) to the initial standby time to calculate the standby time of the direct wave signal.

As described above, when the direct-wave-dominated multipath fading is occurring, the standby time of the direct wave signal increases since the transmission time fluctuation compensation unit 140 corrects the initial standby time using the positive correction value. When the degree of the delay of the indirect wave signal is large, the transmission time fluctuation compensation unit 140 calculates the standby time by correcting the initial standby time using the correction value (+¾T) in which the degree of the increase in the standby time of the direct wave signal is large, and causes the direct wave signal to stand by in accordance with the standby time. On the other hand, when the degree of the delay of the indirect wave signal is small, the transmission time fluctuation compensation unit 140 calculates the standby time by correcting the initial standby time using the correction value (+½T) in which the degree of the increase in the standby time of the direct wave signal is small, and causes the direct wave signal to stand by in accordance with the standby time. In this way, the transmission time fluctuation compensation unit 140 is able to adjust the degree of the increase in the initial standby time in accordance with the degree of the delay of the indirect wave signal.

On the other hand, when the indirect-wave-dominated multipath fading is occurring in which the degree of the delay of the indirect wave signal is small shown in FIG. 6(A), the transmission time fluctuation compensation unit 140 adds the correction value (−½T) to the initial standby time, thereby calculating the standby time of the indirect wave signal. On the other hand, when the indirect-wave-dominated multipath fading is occurring in which the degree of the delay of the indirect wave signal is large shown in FIG. 6(B), the transmission time fluctuation compensation unit 140 adds the correction value (−¾T) to the initial standby time, thereby calculating the standby time of the indirect wave signal.

As described above, when the indirect-wave-dominated multipath fading is occurring, the transmission time fluctuation compensation unit 140 corrects the initial standby time using a negative correction value, as a result of which the standby time of the indirect wave signal is reduced. When the degree of the delay of the indirect wave signal is large, the transmission time fluctuation compensation unit 140 calculates the standby time by correcting the initial standby time using the correction value (−¾T) in which the degree of the decrease in the standby time of the indirect wave signal is large, and causes the indirect wave signal to stand by in accordance with the standby time. On the other hand, when the degree of the delay of the indirect wave signal is small, the transmission time fluctuation compensation unit 140 calculates the standby time by correcting the initial standby time using the correction value (−½T) in which the degree of the decrease in the standby time of the indirect wave signal is small, and causes the indirect wave signal to stand by in accordance with the standby time. In this way, the transmission time fluctuation compensation unit 140 is able to adjust the degree of the decrease in the initial standby time in accordance with the degree of the delay of the indirect wave signal.

When multipath fading is not occurring, the transmission time fluctuation compensation unit 140 uses the initial standby time as the standby time. The initial standby time may be time in which an addition value that can be obtained by adding the minimum correction value (negative value)

that may be calculated by the correction value calculation unit 130 to the initial standby time becomes a positive value. In order to enhance the real-time property of radio communication, the initial standby time is preferably short. The transmission time fluctuation compensation unit 140 causes the radio wave signal to stand by in accordance with the standby time calculated by the aforementioned method, and then supplies the radio wave signal to the transmission time calculation unit 150.

The transmission time calculation unit 150 is a logic circuit that executes transmission time calculation processing for calculating the data transmission time between the transmission apparatus 10 and another transmission apparatus. In the transmission time calculation processing, the transmission time calculation unit 150 calculates the transmission time between the transmission apparatus 10 and the another transmission apparatus using the transmission time when a response request is transmitted to the another transmission apparatus and the reception time when a response to the response request is received from the another transmission apparatus. The transmission time calculation processing will be described later in more detail with reference to FIG. 8.

The time measurement unit 160 is a logic circuit that measures the current time. The time measurement unit 160 provides information indicating the current time in accordance with the requests from the transmission time calculation unit 150 and the time synchronization unit 170.

The time synchronization unit 170 is a logic circuit that transmits the information indicating the current time measured by the transmission apparatus 10 and the transmission time calculated by the transmission time calculation unit 150 to the another transmission apparatus and synchronizes the time measured by the another transmission apparatus with the time measured by the transmission apparatus 10.

When the transmission apparatus 10 serves as a master apparatus, the time synchronization unit 170 transmits, along with a time synchronization request, the transmission time calculated by the transmission time calculation unit 150 and the time information indicating the current time provided by the time measurement unit 160 (transmission time information) to other transmission apparatuses, which are slave apparatuses. On the other hand, when the transmission apparatus 10 serves as a slave apparatus, the time synchronization unit 170 adds, upon receiving the time synchronization request from the another transmission apparatus, which is a master apparatus, the transmission time to the time indicated by the transmission time information received along with the time synchronization request, thereby calculating the time. Then the time synchronization unit 170 supplies the calculated time to the time measurement unit 160 along with a time change request. Upon receiving the time change request from the time synchronization unit 170, the time measurement unit 160 changes the time measured by the time measurement unit 160 to the calculated time.

The transmission unit 180, which is a logic circuit that processes data to be transmitted, includes a modulator 181. The modulator 181 modulates the data to be transmitted in a modulation system of the constellation as shown in FIG. 11 and supplies the modulated data to the multiplexing unit 110.

Figure 2:
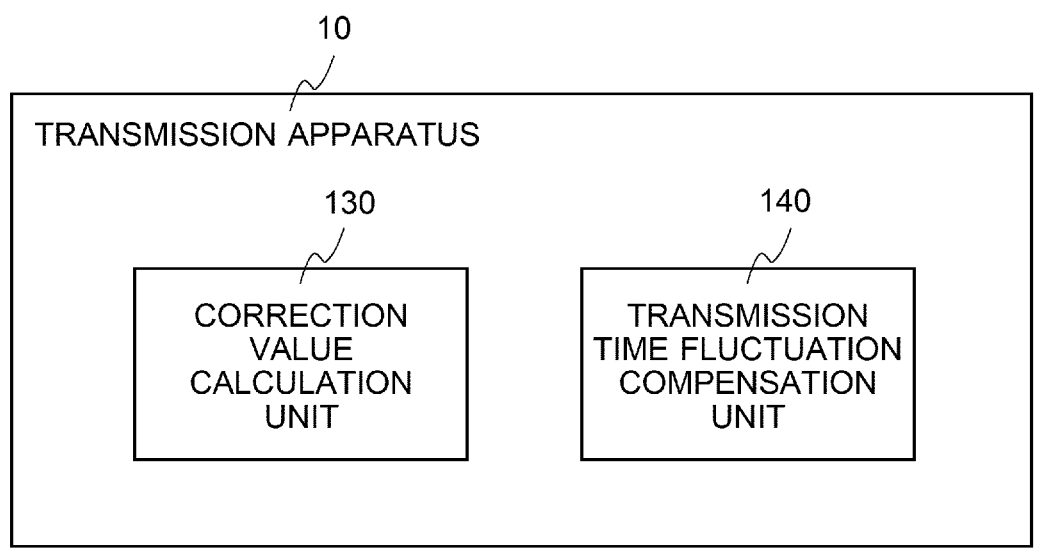
FIG. 2 is a block diagram showing a schematic configuration of the transmission apparatus according to the first example embodiment of the present disclosure.

FIG. 2 is a block diagram showing main components included in the transmission apparatus 10 according to the first example embodiment. The transmission apparatus 10 includes, as its main components, the correction value calculation unit 130 and the transmission time fluctuation compensation unit 140 described above.

Figure 7:
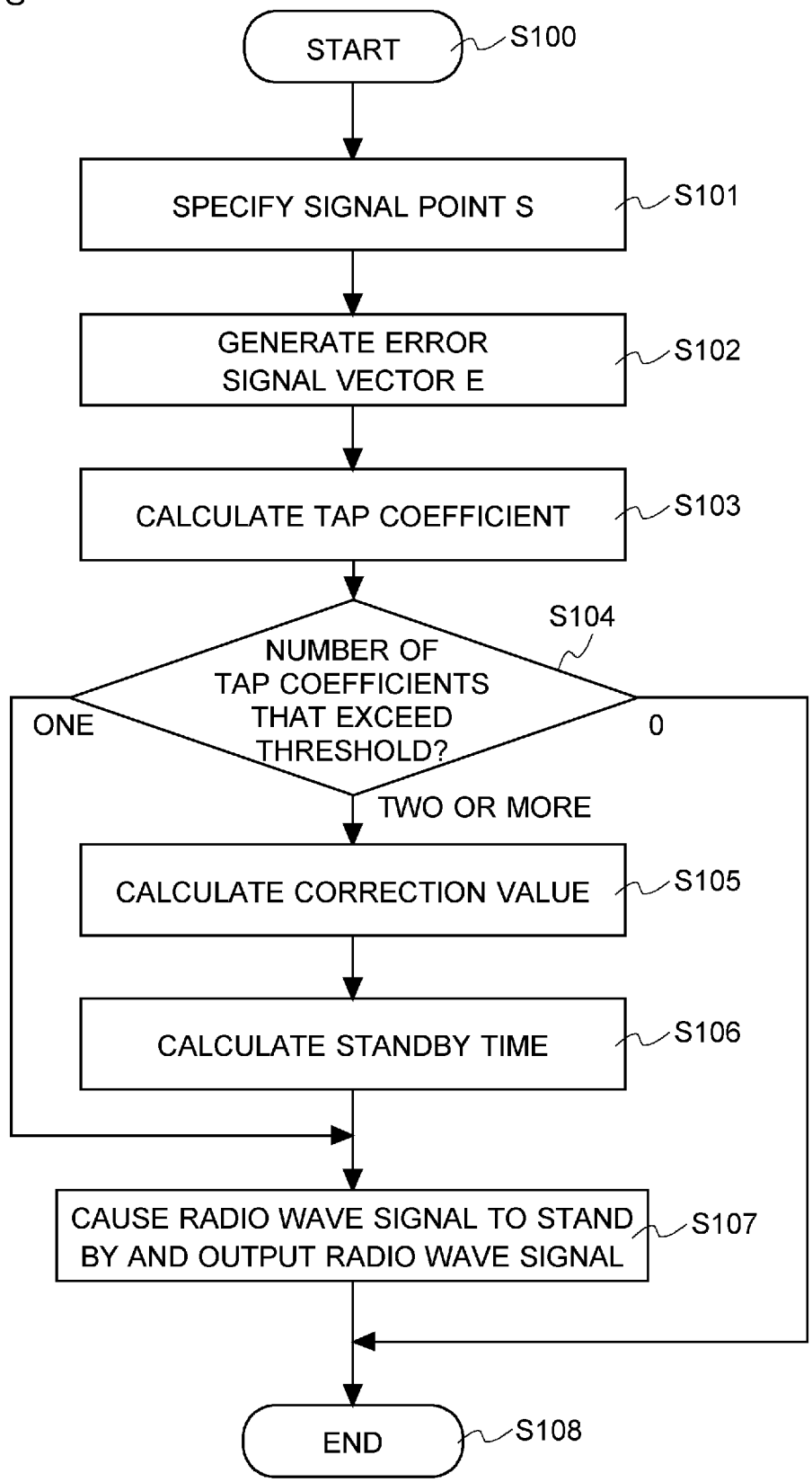
FIG. 7 is a flowchart showing processing executed by the transmission apparatus according to the first example embodiment of the present disclosure.

FIG. 7 is a flowchart showing processing executed by the transmission apparatus 10 according to the first example embodiment of the present disclosure. The processing shown in FIG. 7 starts from Step S100 when the signal point specifying unit 123 receives the radio wave signal from the FIR filter 122. In Step S101, the signal point specifying unit 123 specifies the signal point S from among the signal points indicating ideal radio wave signals in the constellation of the modulation system. In Step S102, the error signal generation unit 124 generates the error signal vector E using the radio wave signal that the transmission apparatus 10 has actually received and the signal point S specified by the signal point specifying unit 123. In Step S103, the tap coefficient generation unit 125 calculates the tap coefficient using the radio wave signal and the error signal vector E generated by the error signal generation unit 124.

In Step S104, the correction value calculation unit 130 determines the number of tap coefficients that exceed the threshold. When the number of tap coefficients that exceed the threshold is 0, the processing ends in Step S108. When the number of tap coefficients that exceed the threshold is one, the processing proceeds to Step S107. When the number of tap coefficients that exceed the threshold is equal to or larger than two, that is, when the multipath fading is occurring, the processing proceeds to Step S105.

In Step S105, the correction value calculation unit 130 calculates the correction value using the reception time of the radio wave signal that relates to the tap coefficient that exceeds the threshold. When the number of tap coefficients that exceed the threshold is two, the correction value calculation unit 130 calculates the correction value using the above-mentioned Expression 1. When the number of tap coefficients that exceed the threshold is equal to or larger than three, the correction value calculation unit 130 calculates the difference time for each tap coefficient that has exceeded the threshold using the reception time of the radio wave signal whose signal intensity is the largest as the reference time, as described above. Then the correction value calculation unit 130 calculates the correction value by dividing the sum of these difference times by the number of tap coefficients that have exceeded the threshold.

In Step S106, the transmission time fluctuation compensation unit 140 corrects the initial standby time using the correction value output from the correction value calculation unit 130 and calculates the standby time. When the number of tap coefficients that exceed the threshold is one, the initial standby time is used as the standby time. In Step S107, the transmission time fluctuation compensation unit 140 causes the radio wave signal whose signal intensity is the largest to stand by in accordance with the standby time, and then outputs this radio wave signal to the transmission time calculation unit 150. Then in Step S108, the processing is ended.

Figure 8:
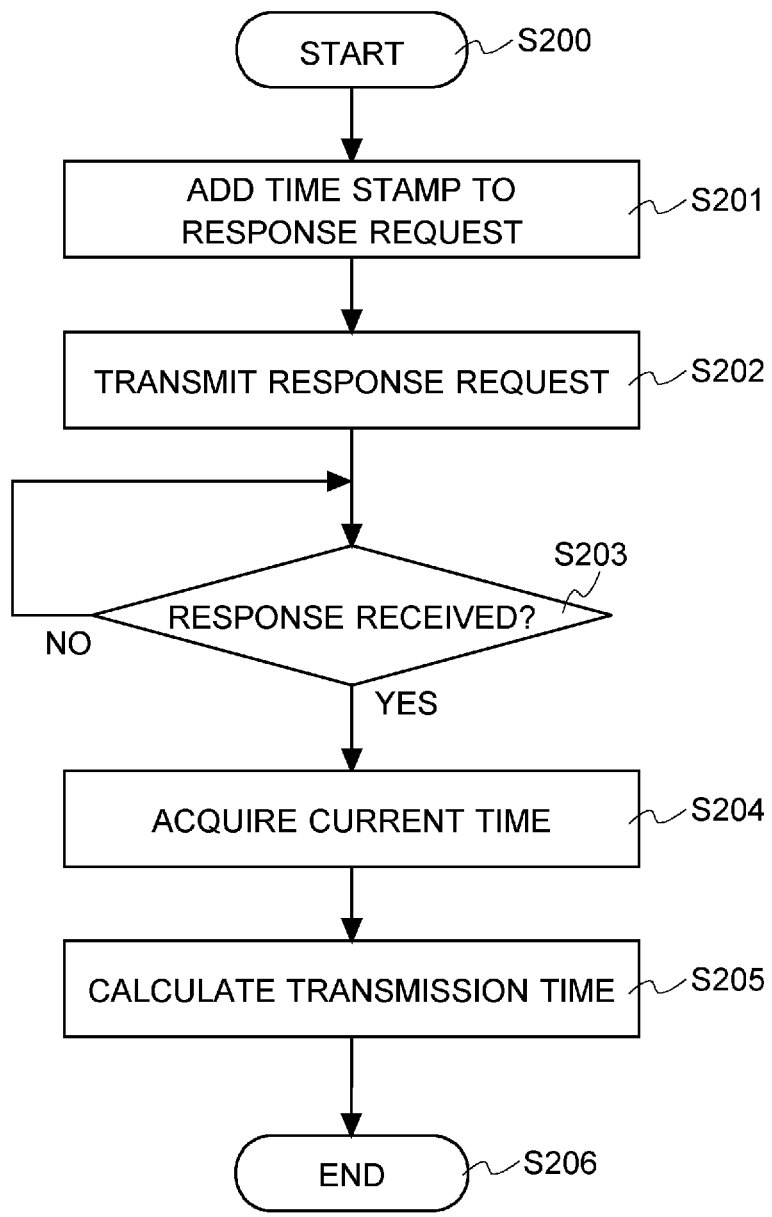
FIG. 8 is a flowchart showing transmission time calculation processing executed by the transmission apparatus according to the first example embodiment of the present disclosure.

FIG. 8 is a flowchart showing one example embodiment of the transmission time calculation processing. The processing shown in FIG. 8 starts from Step S200. In Step S201, the transmission time calculation unit 150 adds a time stamp indicating the current time (transmission time) to a response request for another transmission apparatus. In Step S202, the transmission time calculation unit 150 transmits, to the another transmission apparatus, the response request to which the time stamp has been added via the transmission unit 180, the multiplexing unit 110, and the antenna 100.

In Step S203, the transmission time calculation unit 150 determines whether or not a response to the response request has been received. When the response to the response request has not been received (NO), the processing of Step S203 is executed again. On the other hand, when the response to the response request has been received (YES), the processing proceeds to Step S204. The response request includes the time stamp added in Step S201.

In Step S204, the transmission time calculation unit 150 acquires the current time from the time measurement unit 160. In Step S205, the transmission time calculation unit 150 calculates the difference time between the current time and the transmission time indicated by the time stamp included in the response request, calculates ½ of the calculated difference time as the transmission time, and then the processing is ended in Step S206. While the transmission time calculation unit 150 calculates the transmission time using the transmission time indicated by the time stamp added to the response request in this example embodiment, the transmission time calculation unit 150 may hold the transmission time, calculate the difference time between the transmission time and the time when the response has been received from the another transmission apparatus, and calculate ½ of the calculated difference time as the transmission time in the other example embodiments.

In the first example embodiment, only the transmission apparatus 10 on the receiving side includes a function unit that will be described below, as a result of which the following effects are obtained. That is, when the direct-wave-dominated multipath fading is occurring, the correction value calculation unit 130 calculates the correction value for increasing the initial standby time. Then the transmission time fluctuation compensation unit 140 calculates the standby time of the direct wave signal by correcting the initial standby time using the correction value, causes the direct wave signal to stand by in accordance with the standby time, and then outputs this direct wave signal. On the other hand, when the indirect-wave-dominated multipath fading is occurring, the correction value calculation unit 130 calculates a correction value that decreases the initial standby time. Then the transmission time fluctuation compensation unit 140 calculates the standby time of the indirect wave signal by correcting the initial standby time using the correction value, and causes the indirect wave signal in accordance with the standby time, and outputs this indirect wave signal. As described above, the transmission apparatus 10 increases the standby time of the direct wave signal or decreases the standby time of the indirect wave signal in accordance with the change in the environment of the radio wave propagation path, whereby it is possible to compensate for the fluctuation of the transmission time of the radio wave signal that may occur due to the change in the environment of the radio wave propagation path.

Further, when the direct-wave-dominated multipath fading is occurring in which the degree of the delay of the indirect wave signal is large, the correction value calculation unit 130 calculates the correction value in which the degree of the increase in the initial standby time is large. Then the transmission time fluctuation compensation unit 140 calculates the standby time by correcting the initial standby time using this correction value, and causes the direct wave signal to stand by in accordance with the standby time. On the other hand, when the direct-wave-dominated multipath fading is occurring in which the degree of the delay of the indirect wave signal is small, the correction value calculation unit 130 calculates a correction value in which the degree of the increase in the initial standby time is small. Then the transmission time fluctuation compensation unit 140 corrects the initial standby time using the correction value in which the degree of the increase in the initial standby time is small, and causes the direct wave signal to stand by in accordance with the standby time. Accordingly, the transmission apparatus 10 is able to adjust the degree of the increase in the standby time of the direct wave signal in accordance with the degree of the delay of the indirect wave signal.

Further, when the indirect-wave-dominated multipath fading is occurring in which the degree of the delay of the indirect wave signal is large, the correction value calculation unit 130 calculates the correction value in which the degree of the decrease in the initial standby time is large. Then the transmission time fluctuation compensation unit 140 calculates the standby time by correcting the initial standby time using this correction value, and causes the indirect wave signal to stand by in accordance with the standby time. On the other hand, when the indirect-wave-dominated multipath fading is occurring in which the degree of the delay of the indirect wave signal is small, the correction value calculation unit 130 calculates the correction value in which the degree of the decrease in the initial standby time is small. Then the transmission time fluctuation compensation unit 140 calculates the standby time by correcting the initial standby time using the correction value in which the degree of the decrease in the standby time of the indirect wave signal is small, and causes the indirect wave signal to stand by in accordance with the standby time. Accordingly, the transmission apparatus 10 is able to adjust the degree of the decrease in the standby time of the indirect wave signal in accordance with the degree of the delay of the indirect wave signal.

Further, when multipath fading is occurring due to a direct wave and a plurality of indirect waves, the correction value calculation unit 130 calculates the difference time for each tap coefficient that has exceeded a threshold using the reception time of the radio wave signal whose signal intensity is the largest as the reference time. Then the correction value calculation unit 130 calculates the correction value by dividing the sum of these difference times by the number of tap coefficients that have exceeded the threshold. Then the transmission time fluctuation compensation unit 140 calculates the standby time by correcting the initial standby time using the correction value, and causes the radio wave signal whose signal intensity is the largest to stand by in accordance with the above standby time. Therefore, the transmission apparatus 10 is able to compensate for the fluctuation of the transmission time of the radio wave signal also in the case in which multipath fading is occurring by one direct wave and a plurality of indirect waves.

Further, the transmission time calculation unit 150 executes the transmission time calculation processing in a state in which the fluctuation of the transmission time that may occur depending on the change in the environment of the radio wave propagation path is compensated for to calculate the transmission time between the transmission apparatus 10 and the another transmission apparatus, whereby it is possible to calculate the transmission time in which the fluctuation is compensated for. Then the time synchronization unit 170 transmits the transmission time and time information measured by this time synchronization unit 170 to the another transmission apparatus and synchronizes the time whereby the accuracy of the synchronization of the time in the transmission apparatus 10 and the another transmission apparatus is improved.

Second Example Embodiment

Figure 9:
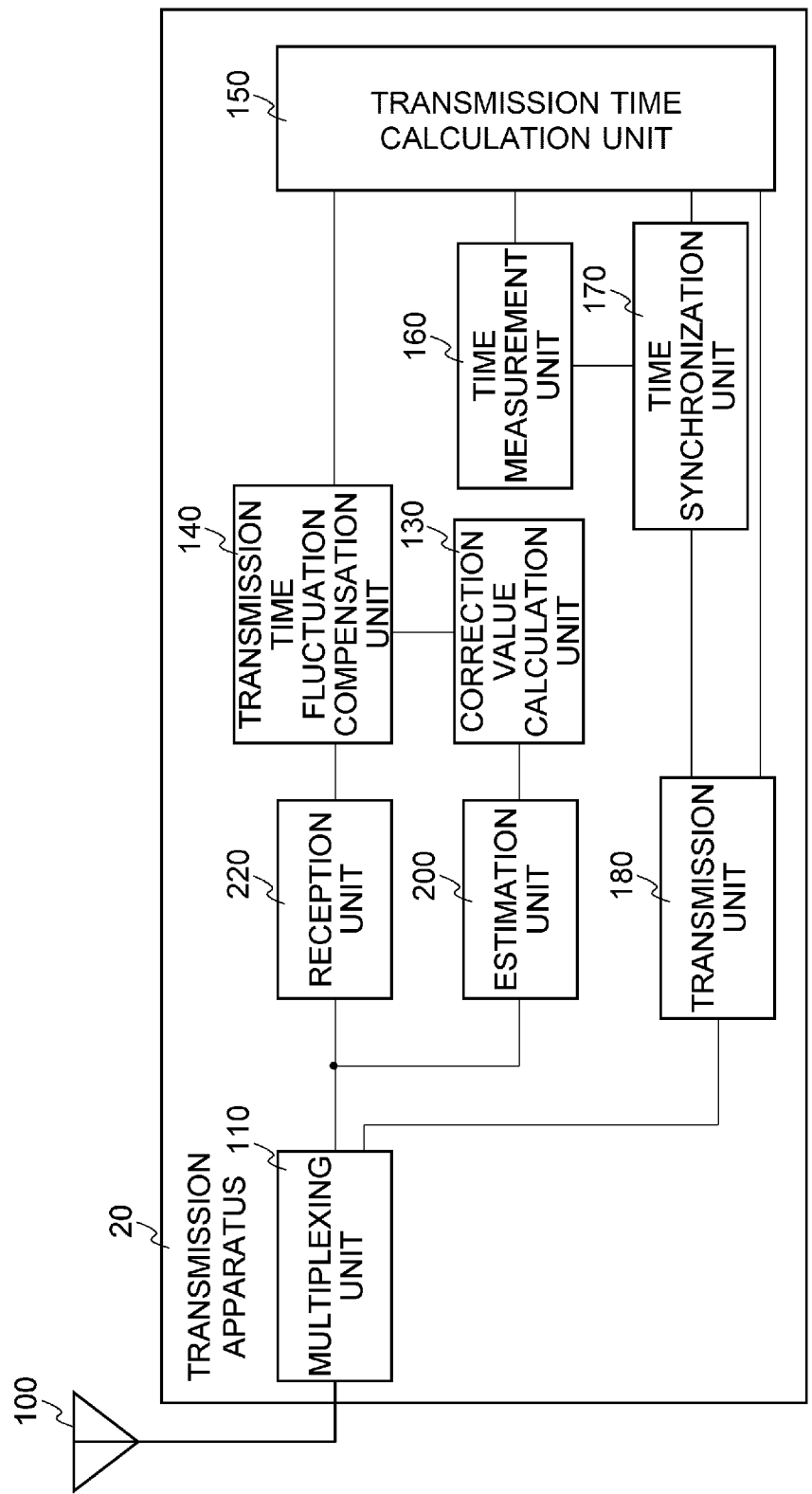
FIG. 9 is a block diagram showing a detailed configuration of a transmission apparatus according to a second example embodiment of the present disclosure.

FIG. 9 is a block diagram showing a detailed configuration of a transmission apparatus according to a second example embodiment of the present disclosure. Hereinafter, with reference to FIG. 9, a transmission apparatus 20 according to the second example embodiment will be described, focusing on the differences from the transmission apparatus 10 according to the first example embodiment.

The transmission apparatus 20 includes an antenna 100, a multiplexing unit 110, a reception unit 220, a correction value calculation unit 130, a transmission time fluctuation compensation unit 140, a transmission time calculation unit 150, a time measurement unit 160, a time synchronization unit 170, a transmission unit 180, and an estimation unit 200. The antenna 100, the multiplexing unit 110, the transmission time fluctuation compensation unit 140, the transmission time calculation unit 150, the time measurement unit 160, the time synchronization unit 170, and the transmission unit 180 have functions the same as those of the corresponding function unit included in the transmission apparatus 10. While the reception unit 220 includes an FIR 122 and a demodulator 126 (not shown), it does not include the signal point specifying unit 123, the error signal generation unit 124, and the tap coefficient generation unit 125 included in the transmission apparatus 10.

Figure 13:
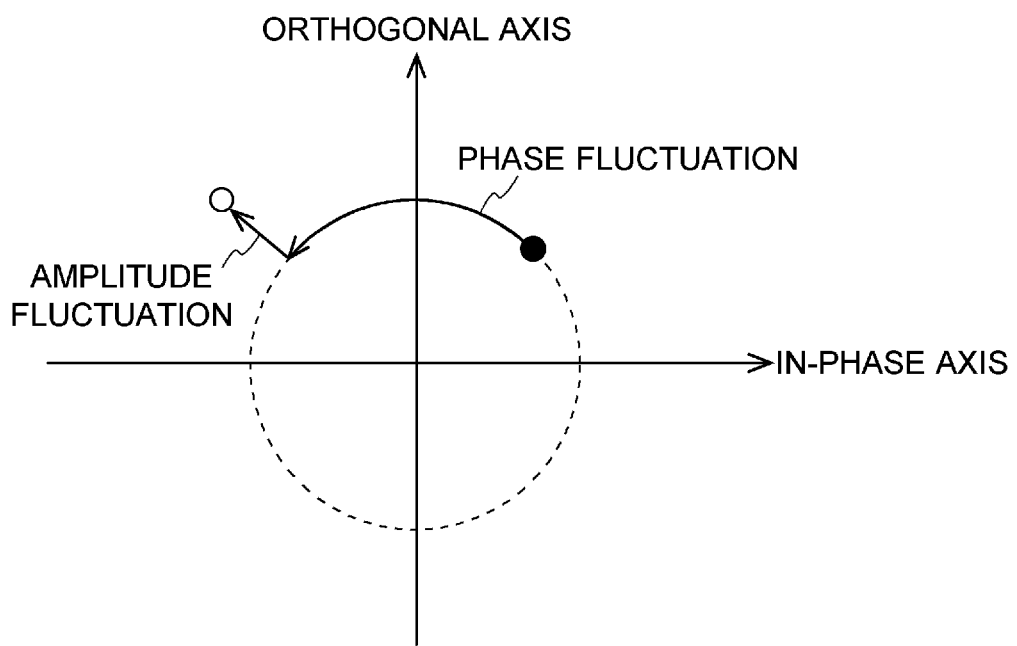
FIG. 13 is a diagram showing a method of estimating amplitude and a phase of a radio wave signal employed by the transmission apparatus according to the first example embodiment of the present disclosure.

The estimation unit 200 is a logic circuit that estimates a time response of the amplitude and the phase of the radio wave signal that may change in the radio wave propagation path. Specifically, the estimation unit 200 receives, as shown in FIG. 13, a known radio wave signal that the transmission apparatus on the transmission side regularly transmits, calculates the fluctuation difference (phase fluctuation and amplitude fluctuation) by comparing the phase and the amplitude of the received radio wave signal with the original phase and amplitude of a known radio wave signal, thereby estimating the time response of the amplitude and the phase of the radio wave signal. The estimation unit 200 supplies the amplitude value of the radio wave signal thus estimated and the time information indicating the reception time of the radio wave signal to the correction value calculation unit 130.

The correction value calculation unit 130 calculates the correction value using the amplitude value of the radio wave signal output from the estimation unit 200 and the time information indicating the reception time of the radio wave signal. Specifically, the correction value calculation unit 130 specifies the radio wave signal whose amplitude value exceeds the threshold from among the radio wave signals output from the estimation unit 200. As this threshold, a value indicating the intensity of the radio wave signal that exceeds the noise level may be, for example, employed. Next, the correction value calculation unit 130 calculates, using the reception time of the radio wave signal whose amplitude value becomes a maximum among the radio wave signals that exceed the threshold as the reference time $t_0$, the difference time between the reception time of the radio wave signal and the reception time of another radio wave signal that exceeds a threshold. Then the correction value calculation unit 130 is able to calculate the correction value by substituting the reference time to and this difference time into the above Expression 1.

In the second example embodiment, the following effects are obtained, like in the first example embodiment. That is, when the direct-wave-dominated multipath fading is occurring, the correction value calculation unit 130 calculates a correction value that increases the initial standby time based on the time information of the estimated amplitude value. Then the transmission time fluctuation compensation unit 140 calculates the standby time by correcting the initial standby time using the above correction value, causes the radio wave signal to stand by in accordance with the standby time, and outputs this radio wave signal. On the other hand, when the indirect-wave-dominated multipath fading is occurring, the correction value calculation unit 130 calculates a correction value that decreases the initial standby time based on the time information of the estimated amplitude value. Then the transmission time fluctuation compensation unit 140 calculates the standby time by correcting the initial standby time using the above correction value, causes the radio wave signal to stand by in accordance with the standby time, and outputs this radio wave signal. In this way, the transmission apparatus 20 increases the standby time of the direct wave signal or reduces the standby time of the indirect wave signal in accordance with the change in the environment of the radio wave propagation path, whereby it is possible to compensate for the fluctuation of the transmission time of the radio wave signal that may occur due to the change in the environment of the radio wave propagation path.

Other Example Embodiments

The expression that the correction value calculation unit 130 uses to calculate the correction value is not limited to Expression 1, and the correction value can be calculated using a desired expression capable of increasing the standby time of the direct wave signal when the direct-wave-dominated multipath fading is occurring and decreasing the standby time of the indirect wave signal when the indirect-wave-dominated multipath fading is occurring.

Further, when the indirect-wave-dominated multipath fading is occurring, the transmission time fluctuation compensation unit 140 may cause the indirect wave signal to stand by in accordance with the initial standby time. In this example embodiment, when the direct-wave-dominated multipath fading is occurring, the correction value calculation unit 130 calculates a correction value for increasing the initial standby time, the transmission time fluctuation compensation unit 140 calculates the standby time using the above correction value, and causes the direct wave signal to stand by in accordance with the standby time.

Further, while the transmission time fluctuation compensation unit 140 causes the radio wave signal demodulated by the demodulator 126 to stand by in the aforementioned example embodiments, the transmission time fluctuation compensation unit 140 may receive the radio wave signal from the signal point specifying unit 123 and supply the radio wave signal to the demodulator 126 after causing the radio wave signal to stand by in the other example embodiments.

Further, while the signal point specifying unit 123, the error signal generation unit 124, the tap coefficient generation unit 125, the correction value calculation unit 130, the transmission time fluctuation compensation unit 140, the transmission time calculation unit 150, the time measurement unit 160, the time synchronization unit 170, and the estimation unit 200 are implemented by the logic circuits in the aforementioned example embodiments, a Central Processing Unit (CPU) may extend a program implemented in these function units in a Random access memory (RAM) and may execute the aforementioned processing in the other example embodiments.

Further, when the radio wave signal is caused to stand by using First In First Out (FIFO) or the like, the transmission time fluctuation compensation unit 140 stores the radio wave signal in a storage element for a predetermined period of time in the aforementioned example embodiments. Alternatively, in the other example embodiments, the time stamp of the radio wave signal may be rewritten and the fluctuation of the transmission time may be compensated for. In this case, there is no need to store the radio wave signal in the storage element for a predetermined period of rime, whereby it is possible to reduce hardware resources.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, and semiconductor memories (such as mask ROM, Programmable ROM (PROM), Erasable PROM (EPROM), flash ROM, RAM, etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above example embodiments and may be changed as appropriate without departing from the spirit of the present disclosure.

This application is based upon and claims the benefit of priority from Japanese Patent Application No. 2018-164334, filed on Sep. 3, 2018, the disclosure of which is incorporated herein in its entirety by reference.

REFERENCE SIGNS LIST

10 Transmission Apparatus
100 Antenna
123 Signal Point Specifying Unit
124 Error Signal Generation Unit
125 Tap Coefficient Generation Unit
130 Correction Value Calculation Unit
140 Transmission Time Fluctuation Compensation Unit
150 Transmission Time Calculation Unit
160 Time Measurement Unit
170 Time Synchronization Unit

What is claimed is:

1. A transmission apparatus configured to:
calculate a correction value for correcting an initial standby time of a direct wave signal or an indirect wave signal based on a reception time of the direct wave signal and a reception time of the indirect wave signal that follows the direct wave signal;
calculate a correction value for increasing the standby time of the direct wave signal when the intensity of the direct wave signal is larger than the intensity of the indirect wave signal;
calculate a correction value for reducing the standby time of the indirect wave signal when the intensity of the indirect wave signal is larger than the intensity of the direct wave signal; and
calculate a standby time by correcting the initial standby time using the correction value and causing the direct wave signal or the indirect wave signal to stand by in accordance with the standby time.

2. The transmission apparatus according to claim 1, wherein
the transmission apparatus is configured to calculate a correction value for increasing the degree of increase/decrease of the standby time of the direct wave signal or the indirect wave signal when the degree of the delay of the indirect wave signal is large, and
calculate a correction value for decreasing the degree of increase/decrease of the standby time of the direct wave signal or the indirect wave signal when the degree of the delay of the indirect wave signal is small.

3. The transmission apparatus according to claim 1, wherein the transmission apparatus is further configured to:
calculate, using a transmission time of a response request for another transmission apparatus and a reception time of a response from the another transmission apparatus in response to the response request, a transmission time between the transmission apparatus and the another transmission apparatus;
transmit information indicating the current time measured by the transmission apparatus and the transmission time to the another transmission apparatus; and
synchronize time measured by the another transmission apparatus with time measured by the transmission apparatus.

4. The transmission apparatus according to claim 1, wherein
the transmission apparatus is further configured to:
specify a signal point whose Euclidean distance from the radio wave signal received by the transmission apparatus becomes a minimum from among a plurality of signal points indicating ideal radio wave signals in a constellation of a modulation system that the transmission apparatus uses;
generate an error signal vector indicating an error between the radio wave signal and the signal point using the radio wave signal and a signal point specified by the transmission apparatus; and
generate a tap coefficient indicating an intensity of the radio wave signal using the radio wave signal and the error signal vector, and
calculate the correction value using the reception time of the radio wave signal that relates to a tap coefficient that has exceeded a threshold.

5. A transmission time fluctuation compensation method for compensating for fluctuation of a transmission time of a radio wave signal, the method comprising:
calculating a correction value for correcting an initial standby time of a direct wave signal or an indirect wave signal based on a reception time of the direct wave signal and a reception time of the indirect wave signal that follows the direct wave signal;
calculating a standby time by correcting the initial standby time using the correction value; and
causing the direct wave signal or the indirect wave signal to stand by in accordance with the standby time, wherein
the calculating the correction value comprises:
calculating a correction value for increasing the standby time of the direct wave signal when the intensity of the direct wave signal is larger than the intensity of the indirect wave signal; and
calculating a correction value for reducing the standby time of the indirect wave signal when the intensity of the indirect wave signal is larger than the intensity of the direct wave signal.

6. A non-transitory computer readable medium storing a transmission time fluctuation compensation program executed in a transmission apparatus, comprising:
a step of causing the transmission apparatus to calculate a correction value for increasing/decreasing an initial standby time of a direct wave signal or an indirect wave signal based on a reception time of the direct wave signal and a reception time of the indirect wave signal that follows the direct wave signal; and a step of causing the transmission apparatus to calculate a standby time by correcting the initial standby time using the correction value and cause the direct wave signal or the indirect wave signal to stand by in accordance with the standby time, wherein the step of calculating the correction value comprises:

a step of calculating a correction value for increasing the standby time of the direct wave signal when the intensity of the direct wave signal is larger than the intensity of the indirect wave signal; and a step of calculating a correction value for reducing the standby time of the indirect wave signal when the intensity of the indirect wave signal is larger than the intensity of the direct wave signal.

\* \* \* \* \*